United States Patent [19]

Sharp

[11] Patent Number: 5,654,526

[45] Date of Patent: Aug. 5, 1997

[54] COUPLING APPARATUS AND METHOD FOR ELECTRICAL CONDUIT

[76] Inventor: Larry C. Sharp, 438 N. San Mateo Dr., San Mateo, Calif. 94401

[21] Appl. No.: 336,776

[22] Filed: Nov. 9, 1994

[51] Int. Cl.⁶ .................................................. H01R 4/00
[52] U.S. Cl. .................... 174/84 R; 174/88 R; 174/84 S; 285/94; 285/404
[58] Field of Search .................. 174/84 R, 88 R, 174/88 S, 84 S; 285/94, 341, 404; 254/134.3 FT

[56] References Cited

U.S. PATENT DOCUMENTS

| | | |
|---|---|---|
| 1,102,965 | 7/1914 | Smith . |
| 2,187,880 | 3/1940 | Kaysing ................................. 285/122 |
| 3,576,334 | 4/1971 | Hemens ................................. 285/149 |
| 3,917,324 | 11/1975 | Wakatsuki et al. ..................... 285/341 |
| 4,054,743 | 10/1977 | Mayer et al. ............................ 174/13 |
| 4,091,523 | 5/1978 | Riecke ................................... 29/526 R |
| 4,234,757 | 11/1980 | Simons ................................. 174/73 R |
| 4,354,053 | 10/1982 | Gold ..................................... 174/84 R |
| 4,630,851 | 12/1986 | Ogawa ................................. 285/341 |
| 4,640,978 | 2/1987 | Kilbane et al. ....................... 174/88 R |
| 4,749,059 | 6/1988 | Jones ................................... 184/15.1 |
| 4,895,221 | 1/1990 | Carlson ............................... 254/134.3 |
| 5,131,697 | 7/1992 | Shumway ............................. 285/404 |
| 5,149,056 | 9/1992 | Jones ................................... 254/134.3 |
| 5,234,234 | 8/1993 | Hearn ................................... 285/328 |

OTHER PUBLICATIONS

Red Dot Ready Reference Guide, 1994, pp. 1,3, 13 and 22.

*Primary Examiner*—Kristine L. Kincaid
*Assistant Examiner*—Chau N. Nguyen
*Attorney, Agent, or Firm*—Feix & Feix

[57] ABSTRACT

A coupling apparatus and method for joining together lengths of electrical conduit in a conduit system. The coupling apparatus includes a resealable port that permits lubricant to be introduced into the coupling apparatus to facilitate wire pulling through a conduit system and to reduce strain on the insulation material of the wire. The coupling apparatus is a generally T-shaped tubular structure and includes a pair of axially-aligned conduit receiving openings which define an inlet and an outlet, respectively. The inlet and outlet openings are spaced a distance apart from one another by a central chamber. The central chamber has an inner tubular diameter substantially equal to the inner tubular diameter of the conduit to be joined in order to provide a smooth transition for wire being pulled through the coupling apparatus. The resealable lubrication port is defined by a vertically oriented tubular leg portion and removable threaded plug which are joined to a middle section of the central chamber.

20 Claims, 1 Drawing Sheet

COUPLING APPARATUS AND METHOD FOR ELECTRICAL CONDUIT

BACKGROUND OF THE INVENTION

1. Field of the Invention

The present invention relates to coupling apparatus and method of use for joining together electrical conduit in a conduit system. The coupling apparatus includes a resealable port for introducing lubrication therein in order to facilitate wire pulling through the conduit system and to reduce strain on the wire insulation material.

2. Brief Description of the Prior Art

The installation of electrical conduit systems in homes and commercial buildings is a labor intensive job. An especially labor intensive task is the feeding and pulling of a bundle of insulated wire through a conduit run.

In the usual case, the wire pulling operation requires at least two or more workers to feed and pull the wire through the conduit run. The wires are attached together at one end to form what is known in the trade as the "head" or "head portion". The head, in turn, is attached to a feeder rope or fish steel which is threaded through the conduit run to assist in pulling the wire therethrough. A first worker at the beginning of the conduit run forms a number of wires coming off separate spools into a bundle with the wires preferably oriented side by side (i.e., the wires do not cross over each other). The worker then feeds the bundle of wire into the conduit system while one or more other workers pull on the feeder rope at the end of the conduit run thereby drawing the wire through the conduit.

Friction between the wire bundle and the inner conduit surface is a major problem which is encountered during the wire pulling operation. Care also must be taken to ensure against damaging the wire insulation. Accordingly, it is necessary to provide sufficient lubrication to the wire bundle as it is being pulled through the conduit run. The head portion, in particular, being a very stiff portion of the wire bundle, presents the greatest source of friction. In accordance with the conventional practice, lubricant is only applied to the head portion of the wire bundle at the beginning of the conduit run. Lubricant applied in this manner tends to wear thin and become ineffective after only a short pulling distance. This increases the strain on the wire being pulled through the conduit system and also requires that the workers pull harder in order to keep the wire bundle moving through the conduit.

Friction is even more problematic in logistically complex conduit runs, such as those commonly found in the ceilings of commercial buildings, which typically have many bends and curves in order accommodate the pre-existing fixed structures in the building, such as, for example, trusses, beams, HVAC hardware, plumbing hardware and the like. The presence of such fixed structures make a straight line conduit run impossible or impractical. If, during the wire pulling procedure, the head gets snagged on some bump or imperfection in the interior surface of the conduit or gets stuck in the middle of a bend in the conduit run, all pushing on the wire bundle must be stopped as the continued pushing only causes the wire bundle to bunch up and the individual wires to cross over each other. This causes the diameter of the wire bundle to expand which, in turn, increases friction and complicates the wire pulling operation. If the friction on the head and wire becomes to great, the pulling strain on the conduit system can quickly exceed recommended safety margins. More importantly, the increased friction can break down the wire insulation and thereby adversely effect the insulation's di-electric value.

In lengthy conduit runs or in conduit runs which contain 180° bends or where the wire size is 1/0 cm or larger, a pulling motor is required to pull the wires through the conduit system. The conduit system will give warning by making groaning and creaking noises when there is excessive friction. In this situation, the pulling force must be reduced. This increases the time and effort it takes to complete the job. It would therefore be desirable to be able to reapply lubrication to the head of the wire bundle at selected locations in a conduit run in order to reduce friction on the head and thereby facilitate safe and efficient wire pulling through the conduit run during an installation or repair or remodel.

It would further be desirable to incorporate a means for introducing lubricant at one or more conduit couplings in a conduit run so that the installation for a conduit system can be planned with a sufficient number of lubrication points to ensure low friction and trouble free wire pulling therethrough.

Conduit fittings having removable plates which permit access to an interior portion of the conduit body are known from the prior art. These conduit fittings are designed for use in exposed conduit applications which allow convenient access by a worker. Such conduit fittings typically have enlarged diameter central body portions or other structure such as large diameter adjoining pipe sections which present snag points for the head portion of a wire bundle being pulled therethrough. In other words, the prior art fittings do not have sufficient internal structure in the conduit body to guide the wire through the conduit fitting without human assistance.

Accordingly, there is a definite need in the art for a conduit coupling which includes means for permitting the introduction of lubricant and wherein the wire being pulled through the conduit coupling is self-guiding.

SUMMARY OF THE INVENTION

List of Objectives

It is therefore a principal object of the present invention to be able to provide a point of entry for lubrication at selected locations in an electrical conduit run to minimize friction and reduce wire insulation strain when pulling insulated electrical wire through the conduit run.

It is a related object of the invention to reduce the effort to workers in pulling a bundle of large diameter wire through a conduit run.

It is another object of the present invention to increase the safety to workers in pulling wire through a conduit system which already has energized wires in place, such as during a remodel or an extension of an existing conduit system.

Briefly, a preferred embodiment of the present invention comprises a coupling apparatus for use in joining together lengths of electrical conduit, and which includes a resealable port that permits lubricant to be introduced into the coupling apparatus. The coupling apparatus is a generally T-shaped tubular structure and includes a pair of axially-aligned conduit receiving openings defining an inlet and an outlet, respectively. The inlet and outlet are spaced a distance apart from one another by a central chamber. The central chamber has an inner tubular diameter substantially equal to the inner tubular diameter of the conduit to be joined in order to provide a smooth transition for the wire being pulled through the coupling. The central chamber also includes a hole in a side wall thereof over which an integrally attached upstanding or vertically oriented tubular leg portion is located. The tubular leg portion and hole define a lubrication port which permits lubricant to be introduced onto the head portion of a bundle of wire as the wire is pulled through the coupling.

The lubrication port is fitted with a removable plug which is preferably threaded with a sufficient number of threads, typically three or more, such that the plug will contain electrical arcing in compliance with building code regulations for conduit installation. The lubrication port and/or plug further includes a shoulder or stop member for limiting the downward travel of the plug into the port such that the plug does not penetrate into the interior of the central chamber of the coupling. In this way, the plug, itself, does not present an obstruction for wire being pulled through the coupling. The port opening is preferably smaller where it joins the central chamber to prevent plug interference.

List of Advantages

An important advantage of the present invention is that the lubrication port is useful for providing lubrication to the head (i.e. the region where the wires attach to the feeder rope or fish steel) which happens to be the region of highest stiffness and greatest friction.

Another advantage of the present invention is that the lubrication port also provides a visual inspection point to the interior of the conduit system. This allows a worker to follow the head in order to determine when to apply lubrication and thereby shorten the time and effort required to complete the job.

Another advantage of the present invention is that a number of coupling apparatus may be used at spaced locations in a conduit run to ensure that the head remains well lubricated during the wire pulling operation thereby reducing the pulling strain on the wires and on the wire insulation the effort that the workers must exert in doing their job.

Still another advantage of the present invention is that conduit systems can be made longer and accommodate a greater number of bends.

These and other objects and advantages of the present invention will no doubt become apparent to those skilled in the art from the following drawings, detailed description of the preferred embodiment and the appended claims.

IN THE DRAWINGS

DESCRIPTION OF THE PREFERRED EMBODIMENT

Figures 1, 2, 3:
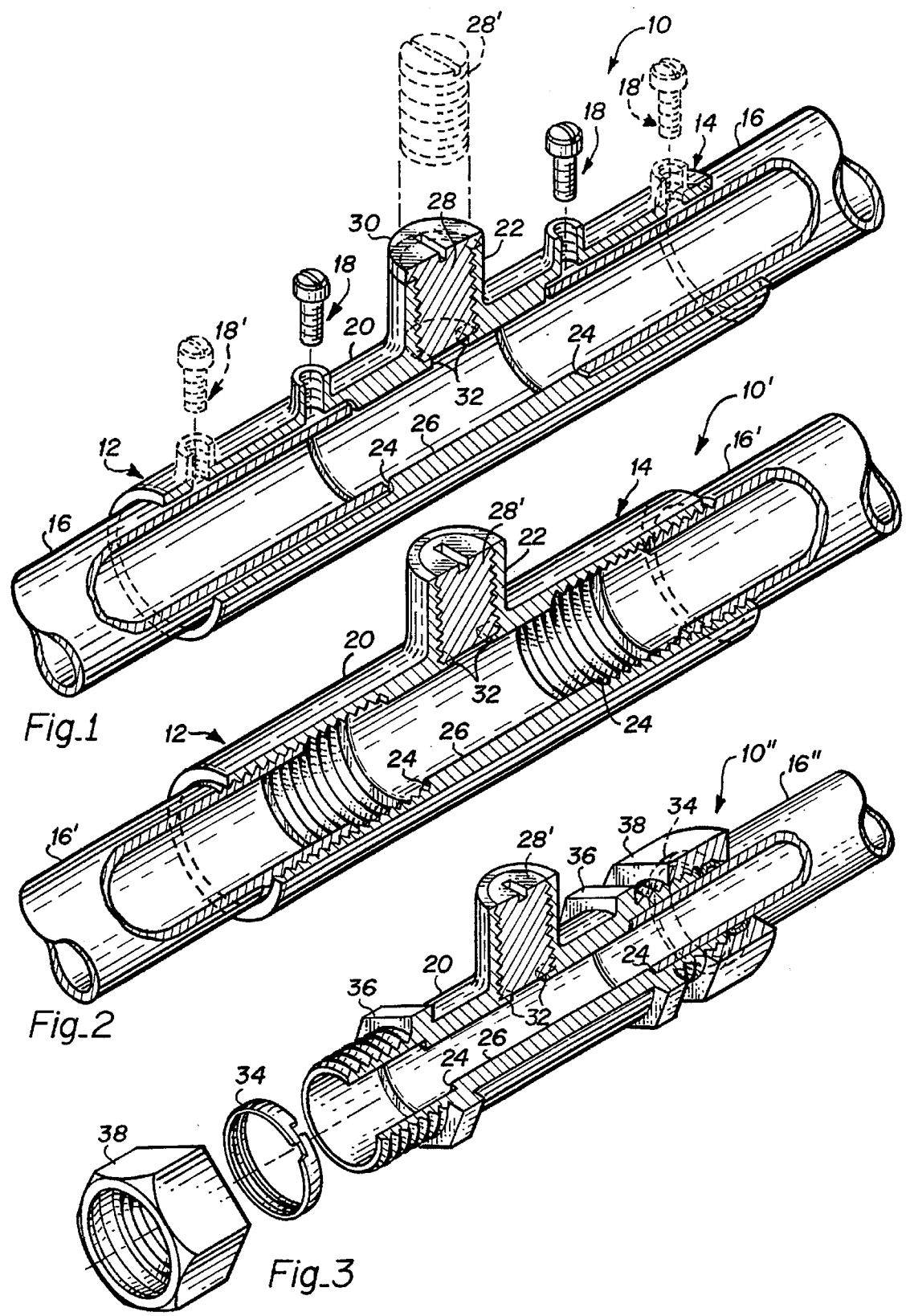
FIG. 1 is an isometric view of an electrical conduit coupling apparatus constructed in accordance with one embodiment of the present invention.
FIG. 2 is an isometric view of an electrical conduit coupling apparatus constructed in accordance with a second embodiment of the present invention.
FIG. 3 is an isometric view of an electrical conduit coupling apparatus constructed in accordance with a third embodiment of the present invention.

The following detailed description illustrates the invention by way of example, not by way of limitation of the principles of the invention. This description will clearly enable one skilled in the art to make and use the invention, and describes several embodiments, adaptations, variations, alternatives and uses of the invention, including what I presently believe is the best mode of carrying out the invention.

An electrical conduit coupling apparatus constructed in accordance with one embodiment of the present invention is indicated generally by the reference numeral 10 in FIG. 1.

The coupling apparatus 10 is a generally T-shaped tubular structure and includes a first tubular connector portion or inlet end 12 and a second tubular connector portion or outlet end 14. The inlet end 12 and outlet end 14 are sized for receiving close tolerance engagement of electrical conduit 16. In the embodiment shown, the electrical conduit 16 is standard electrical metal tubing (EMT).

The coupling apparatus 10 also includes fastening means 18 for holding the conduit 16 within the tubular recess of inlet end 12 and outlet end 14, such as threaded fasteners, clamps, or twist-lock fittings, with threaded fasteners, such as bolts or screws, being preferred. Each connector portion (i.e. inlet end 12 and outlet end 14) of the coupling apparatus 10 preferably include at least one screw fastener 18 but may also include additional screw fasteners 18' (indicated in phantom) as desired. The inlet and outlet ends 12, 14 are separated by a T-shaped tubular portion which includes a horizontal leg or main body portion 20 and an upstanding or vertically oriented tubular leg portion 22. The edge regions 24 of the inner surface 26 of the horizontal main body portion 20 define shoulders against which the inserted ends of the conduit 16 abut. The horizontal main body portion 20 is provided with a reduced inner diameter which is sized to be substantially equal to the inner diameter of the conduit 16 in order to form a substantially smooth and continuous surface transition between the conduit 16 and the horizontal main body portion 20. In this way, the potential sources for drag and friction are minimized when wire is being pulled through the coupling apparatus 10 from the inlet end 12 to the outlet end 14.

The upstanding vertical leg portion 22 defines a lubrication port whereby lubricant can be applied to the head of a wire bundle as it is being pulled through the coupling apparatus 10. The diameter of the port is sufficiently large to introduce an effective amount of lubricant yet not so large so as to snag the head portion of a wire bundle being pulled through the coupling apparatus. As an example, for a 4.0 inch diameter conduit, a port opening of about 0.5 inches has been found to work adequately. For port diameters in excess of 0.5 inches, the head may snag or catch on the opening as it is wriggling through coupling apparatus.

In practice, several coupling apparatus 10 of the present invention are preferably used in a conduit run and are located at a desired distance interval apart from one another, for example every twenty feet or so, or are located immediately adjacent a bend in the conduit run. In this way, the lubrication may be reapplied to the head at several points in the conduit run as needed in order to reduce the friction on the head of wire bundle as the wire is being pulled through the conduit run.

The vertical leg portion 22 is provided with a plug 28 which, when inserted as shown, extends downwardly to occupy substantially the entire interior volume of the vertical leg portion 22. The plug 28 and interior wall of the vertical leg portion 22 are preferably threaded to provide locking engagement therebetween. The plug 28 preferably includes a sufficient number of threads, for example six or more, to ensure that it will not come loose from the vertical leg portion 22 in the event of a gas explosion in the conduit system. Such explosions, may occur for example, in the aftermath of an earthquake, hurricane of other natural disaster.

The plug 28 also preferably includes stop limiting means for limiting the downward travel of the plug 28 into the vertical leg portion 22 such that the plug does not penetrate into the interior of the main body portion 20 and present an obstruction to wire as it is being pulling through the coupling apparatus 10. In the preferred embodiment, the stop limiting means includes a shoulder 30 provided to the top of the plug which abuts against the top opening of the vertical leg portion 22 as the plug 28 is being screwed into the fully closed position as shown.

Alternative structures for the stop limiting means include a stop or shoulder member 32 disposed along the inner wall of the vertical leg portion adjacent the junction with the main body portion 20. For such an alternative structure, the plug 28 does not require its own shoulder 30. See for example the plug 28' shown in phantom in FIG. 1. Alternatively, the opening's threads could be tapered (not shown) to prevent plug intrusion.

FIGS. 2 and 3 show alternate embodiments 10' and 10", respectively, for the coupling apparatus of the present invention. Elements of the alternate embodiments 10' (FIG. 2) and 10" (FIG. 3) which are common to the elements of the preferred embodiment (FIG. 1) share the same reference numerals.

FIG. 2 discloses a coupling apparatus for replacing a conventional "rigid" coupler for joining heavy duty thick wall rigid piping of the kind used in conduit runs which are exposed along walls or ceilings. In this embodiment, the fastening means for securing the rigid conduit 16' within the inlet end 12 and outlet end 14 of the coupling apparatus 10' comprise corresponding threads and grooves provided to the outer wall of the rigid piping 16' and the inner wall of the inlet end 12 and outlet end 14, respectively.

FIG. 3 discloses a coupling apparatus, 10" for replacing a conventional "water tight" conduit coupling. In this embodiment, the fastening means for securing the conduit 16" within the inlet end 12 and outlet end 14 of the coupling apparatus 10" comprise coupling hardware found on conventional water tight conduit couplings and include a lock nut 38 and an expansion ring 34. Further, each of the inlet and outlet ends 12 and 14 are provided with an integrally formed nut 36 which functions as a stop for its respective lock nut 38.

It should be understood that various modifications within the scope of this invention can be made by one of ordinary skill in the art without departing from the spirit thereof. I therefore wish my invention to be defined by the scope of the appended claims as broadly as the prior art will permit, and in view of the specification if need be.

I claim:

1. A coupling apparatus for coupling adjoining ends of electrical conduit in an electrically grounded conduit system of the type in which a bundle of insulated electrical wire is pulled therethrough during an installation, repair or remodel of the conduit system, wherein the coupling apparatus comprises:
   a) a first tubular connector end sized for receiving an end portion of a first tubular conduit member, said first tubular connector end constructed to provide a continuous electrical bond with said first tubular conduit member;
   b) a second tubular connector end sized for receiving an end portion of a second tubular conduit member, said second tubular connector end constructed to provide a continuous electrical bond with said second tubular conduit member;
   c) fastening means for securing a respective end portion of said first and second tubular conduit members within a respective one of said first and second tubular connector ends;
   d) a generally T-shaped tubular portion disposed between said first and second tubular connector ends, and wherein said T-shaped tubular portion further includes:
      i) a horizontally oriented tubular leg portion including first and second end portions formed integral with respective ones of said first and second tubular connector ends, said horizontally oriented tubular leg portion having a smooth inner tubular surface and an inner diameter corresponding to an inner diameter dimension of adjoining conduit members connected by said first and second tubular connector ends, said smooth inner surface and inner diameter for facilitating substantially snag-free passage of a head portion of a bundle of insulated electrical wire as the bundle of insulated electrical wire is pulled through the coupling apparatus;
      ii) a vertically oriented tubular leg portion extending upwardly from said horizontally oriented leg portion, said vertically oriented tubular leg portion defining a port for providing visual inspection of and for introducing lubricant to the portion head and wire bundle as they are being pulled through the conduit system; said port having a diameter of a size sufficiently large to introduce an effective amount of lubricant and yet sufficiently small so as not to snag the head portion as it passes thereby;
      iii) plug means for plugging said vertically oriented tubular leg portion and contain electrical arcs within the conduit system; and
      iv) stop limiting means for limiting downward travel of said plug means such that said plug means is prevented from penetrating said horizontally oriented tubular leg portion and from obstructing the pulling of the wire through the conduit system.

2. A coupling apparatus as in claim 1 wherein:
   a) said first and second tubular connector ends are adapted to receivingly engage smooth wall conduit members which comprise electrical metal tubing; and
   b) said fastening means comprise threaded screw fasteners.

3. A coupling apparatus as in claim 2 wherein said plug means comprises a threaded plug.

4. A coupling apparatus as in claim 3 wherein said stop limiting means comprises a stop member disposed along an inner surface of said vertical leg portion.

5. A coupling apparatus as in claim 3 wherein said stop limiting means comprises a shoulder formed along a top portion of said threaded plug.

6. A coupling apparatus as in claim 1 wherein:
   a) said first and second tubular connector ends are adapted to receivingly engage conduit members which comprise thick wall rigid metal tubing; and
   b) said fastening means comprise interengagable threads and grooves provided to an outer surface of said conduit members and an inner surface of said tubular connector ends.

7. A coupling apparatus as in claim 6 wherein said plug means comprises a threaded plug.

8. A coupling apparatus as in claim 7 wherein said stop limiting means comprises a stop member disposed along an inner surface of said vertical leg portion.

9. A coupling apparatus as in claim 7 wherein said stop limiting means comprises a shoulder formed along a top portion of said threaded plug.

10. A coupling apparatus as in claim 1 wherein said fastening means comprise a water tight coupling including a lock nut and an expansion ring.

11. A coupling apparatus as in claim 10 wherein said plug means comprises a threaded plug.

12. A coupling apparatus as in claim 11 wherein said stop limiting means comprises a stop member disposed along an inner surface of said vertical leg portion.

13. A coupling apparatus as in claim 11 wherein said stop limiting means comprises a shoulder formed along a top portion of said threaded plug.

14. A method of reducing strain on electrical wire insulation material of insulated electrical wire when being pulled as a wire bundle through an electrical conduit system comprising:

a) placing a conduit coupling apparatus at selected spaced locations in a conduit system, wherein said conduit coupling apparatus includes:

a first tubular connector end sized for receiving an end portion of a first tubular conduit member;

a second tubular connector end sized for receiving an end portion of a second tubular conduit member;

fasteners for securing a respective end portion of said first and second tubular conduit members within a respective one of said first and second tubular connector ends;

a generally T-shaped tubular portion disposed between said first and second tubular connector ends, and wherein said T-shaped tubular portion further includes:

a horizontally oriented tubular leg portion including first and second end portions formed integral with respective ones of said first and second tubular connector ends, said horizontally oriented tubular leg portion having a smooth inner tubular surface and an inner diameter corresponding to an inner diameter dimension of adjoining conduit members connected by said first and second tubular connector ends, said smooth inner surface and inner diameter for facilitating substantially snag-free passage of a head portion of a bundle of insulated electrical wire as the bundle of insulated electrical wire is pulled through the coupling apparatus;

a vertically oriented tubular leg portion extending upwardly from said horizontally oriented leg portion, said port having a diameter of a size sufficiently large to introduce an effective amount of lubricant and yet sufficiently small so as not to snag the head portion as it passes thereby;

a plug member for plugging said vertically oriented tubular leg portion and contain electrical arcs within the conduit system; and a stop member for limiting downward travel of said plug member such that said plug members is prevented from penetrating said horizontally oriented tubular leg portion and from obstructing the pulling of the wire through the conduit system; and b) introducing lubricant into said lubrication port of the conduit coupling apparatus as a head portion of a wire bundle of insulated electrical wire is being pulled through the conduit system.

15. A coupling apparatus for coupling adjoining ends of electrical conduit in an electrically grounded conduit system of the type in which a bundle of insulated electrical wire is pulled therethrough during an installation, repair or remodel of the conduit system, wherein the coupling apparatus comprises:

a) a first tubular connector end sized for receiving an end portion of a first tubular conduit member, said first tubular connector end constructed to provide a continuous electrical bond with said first tubular conduit member;

b) a second tubular connector end sized for receiving an end portion of a second tubular conduit member, said second tubular connector end constructed to provide a continuous electrical bond with said second tubular conduit member;

c) a fastener structure provided to each of said first and second tubular connector ends for securing a respective end portion of said first and second tubular conduit members within a respective one of said first and second tubular connector ends;

d) a generally T-shaped tubular portion disposed between said first and second tubular connector ends, and wherein said T-shaped tubular portion further includes:

i) a horizontally oriented tubular leg portion including first and second end portions formed integral with respective ones of said first and second tubular connector ends, said horizontally oriented tubular leg portion having a smooth inner tubular surface and an inner diameter corresponding to an inner diameter dimension of adjoining conduit members connected by said first and second tubular connector ends, said smooth inner surface and inner diameter for facilitating substantially snag-free passage of a head portion of a bundle of insulated electrical wire as the bundle of insulated electrical wire is pulled through the coupling apparatus;

ii) a vertically oriented tubular leg portion extending upwardly from said horizontally oriented leg portion, said vertically oriented tubular leg portion defining a port for providing visual inspection of and for introducing lubricant to the head portion and wire bundle as they are being pulled through the conduit system; said port having a diameter of a size sufficiently large to introduce an effective amount of lubricant and yet sufficiently small so as not to snag the head portion as it passes thereby;

iii) a plug member for plugging said vertically oriented tubular leg portion and contain electrical arcs within the conduit system; and iv) a stop member for limiting downward travel of said plug member such that said plug member is prevented from penetrating said horizontally oriented tubular leg portion and from obstructing the pulling of the wire through the conduit system.

16. A coupling apparatus as in claim 15 wherein said fastener comprises threaded screw fasteners.

17. A coupling apparatus as in claim 16 wherein said plug member threadingly engages within said vertically oriented tubular leg portion.

18. A coupling apparatus as in claim 17 wherein said stop member comprises a protrusion disposed along an inner surface of said vertical leg portion.

19. A coupling apparatus as in claim 17 wherein said stop member comprises a shoulder formed along a top portion of said plug member.

20. A coupling apparatus as in claim 15 wherein said fastener comprises a water tight coupling including a lock nut and an expansion ring.

* * * * *